Figure 1:
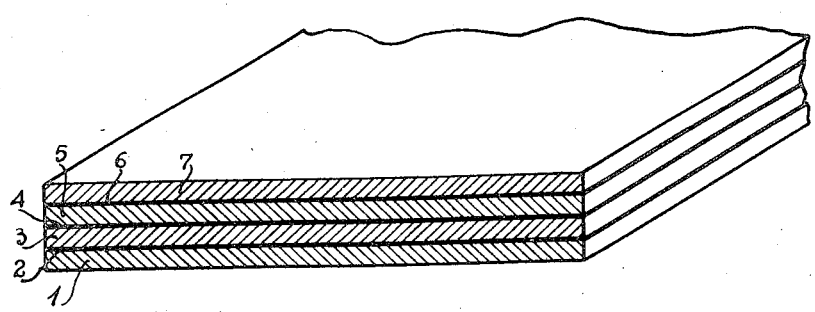

July 7, 1959     P. BOVE     2,893,907

COVERING AND WATERPROOFING MATERIAL

Filed Feb. 17, 1955

INVENTOR

PIERRE BOVE

By Young, Emery & Thompson

ATTYS

United States Patent Office 2,893,907
Patented July 7, 1959

2,893,907

COVERING AND WATERPROOFING MATERIAL

Pierre Bove, Paris, France

Application February 17, 1955, Serial No. 488,935

Claims priority, application France March 5, 1954

3 Claims. (Cl. 154—50)

The present invention relates to materials intended for use in coverings for buildings or in the production of waterproof or heat insulating coverings, and for all the uses of materials of the kind produced in sheet form.

Products in sheet form, such as bitumen-treated felts, tarred cardboard, and flexible sheets, employed in the applications referred to, are generally constituted by a base, usually of vegetable or animal fibre, paper, cardboard, felt or canvas, impregnated or impregnated and coated with a waterproofing product such as bitumen or tar.

These sheets are wholly or partly manufactured in the factory and are delivered in sheets or in rolls, each sheet comprising a single reinforcement.

For the purpose of waterproofing, it has been recognised as desirable to superimpose on these sheets of reinforcement a number of layers by dipping in a waterproofing-base bath, so as to obtain a multi-layer compound having a foliated structure.

It has in fact been observed that the fact of forming the roofing or the covering in superposed layers, separated by the reinforcements, prevents the light elements of the proofing base from penetrating into the thickness of the material, and this, added to the mutual protection which the various layers give to each other, prevents the material from ageing too quickly. In addition, as the reinforcing layers maintain the proofing base in position, an accident may happen to one of these reinforcements without destroying the waterproof properties of the covering as a whole. Finally, the creation of a number of sliding planes enables a higher resistance to be obtained against mechanical stresses.

The production of these multi-layer coverings is carried out at the place where they are used, and comprises a number of operations of treatment and handling which result in a high cost of production.

In order to remedy this drawback, attempts have been made to produce the material by direct pre-fabrication in a complex multi-layer form. However, on the one hand, the lack of flexibility of the usual reinforcement layers, and on the other hand the lack of homogeneity due to the foliated structure, have made it impracticable for the material to be obtained in the form of rolls, which is desirable both for transport purposes and for convenience and rapidity for use.

The present invention has for its object a material which complies with the conditions referred to above, that is to say, which combines the flexibility necessary for its preparation in the form of rolls with the foliated structure which prevents the inter-penetration of certain components of the proofing base, this material having in addition, further advantages.

The material in accordance with the invention is characterised in that between the layers of the waterproofing base bitumen, tar or the like, pure or mixed, there are interposed one or a number of sheets of plastic material, the said sheets constituting the reinforcement members of the whole covering sheet.

The plastic material from which the reinforcing sheet is made is preferably taken from the class of macromolecular structure resulting from the polymerisation or from the condensation of synthetic resins. Chlorides or acetates of vinyl, styrene or polystyrene, polyethylene, synthetic rubbers, etc., are particularly well suited to the application considered. From the chemical point of view, these compounds are especially stable and inert, while from the physical point of view, they are flexible, tough and strong.

It will be understood that the reinforcing layer, consisting of a continuous and waterproof sheet, constitutes in itself the foliated structure which prevents interpenetration of the light elements of the proofing base.

This special feature constitutes a distinct advantage as compared with the usual reinforcement layers of paper, cardboard, felt and canvas which would have in themselves no complete water-tightness and the function of which is limited to holding the proofing base in position. Whilst these usual reinforcements slow down but do not prevent the interpenetration of the light elements into the thickness of the proofing base, the reinforcement of the material in accordance with the invention is perfectly waterproof and constitutes a complete barrier against the interpenetrating elements. This advantage is obtained even with a material having a reinforcement of only one sheet of plastic material.

It has already been proposed to cover a waterproofing material consisting of the usual layers of proofing base with reinforcing layers of felt or material, with a single sheet of plastic material (French Patent No. 1,042,107 of September 11, 1951). But the present invention differs essentially from this arrangement in that the sheets of plastic material are used to replace the reinforcements themselves of the material, the sheets of plastic material being interposed in the thickness, so as to be comprised in the mass of the material and not on its surface.

By virtue of its flexibility allied to the similar properties of the proofing bases, plastic material in sheets enables a complex multi-layer material to be made and distributed in rolls, the successive layers of plastic material enclosing thicknesses of the proofing base.

Furthermore, it is possible to increase the flexibility of this sheet by methods such as crimping, pleating or corrugating of the reinforcing sheets, applied during the course of manufacture. This flexibility may also be increased by the use of reinforcement layers which differ from one layer to the other.

The adhesion of the proofing base to the plastic material may be improved, if this is necessary, by the use of a composite plastic sheet or a plastic sheet with a specially-treated surface.

In addition, the reinforcement sheet of plastic material, forming part of the material in accordance with the invention, has the advantage of being impervious to chemical action and to microbes. It is inoxidisable and rot-proof, which, as compared with the usual reinforcements, gives it an increased permanence and, in consequence, long life. These qualities may, furthermore, be accentuated by suitable treatment of the plastic material employed.

It is to be noted that the reinforcement of plastic material possesses at the same time the qualities of being rot-proof, waterproof, flexible and homogeneous which have been sought for the material considered, and of which one or another may be found separately in the products previously used for the reinforcement of covering materials of the same kind, but which are not present all at one and the same time.

The sheet of plastic material which constitutes the reinforcement of the covering material may be further strengthened by incorporating in it a fibrous or woven material: glass fibre, plastic fibre, asbestos, etc. In this way, there is obtained a multi-layer material having a triple structure comprising the proofing base, plastic material and the further reinforcement.

This reinforcing texture may be applied to the sheet of plastic material by inclusion, applying to the surface or in any other way. It may also be incorporated in the sheet of plastic material itself or in a layer of waterproofing base.

The plastic material which constitutes the reinforcement either alone or in a mixed form, may with advantage be chosen so as to become soft and melt at temperatures greater than those at which the proofing base itself becomes soft and melts. The margin between these temperatures may easily be obtained by a judicious choice to have any desired value, for example of the order of several multiples of ten degrees centigrade.

The thickness of the reinforcements of plastic material may be small and substantially smaller than that of the usual types of reinforcement. Thus, for the same thickness of a complex multi-layer material, the number of reinforcements of plastic material may be increased, and this improves the qualities of the material, for example its behavior when laid in hot weather over sloping surfaces.

During its application, and also during its life, the reinforcement of plastic material retains, as is required, a toughness and a strength which are greater than those of the product used for the coating. But the physical properties of the reinforcement and of the coating product remain comparable with each other. Thus, especially during heating for inclusion or jointing, if the proofing base of bitumen tar or the like is softened to the vicinity of the liquid state, the reinforcements themselves are in the malleable state. This particular feature is of great advantage in ensuring water-tightness directly and without special expedients on the grooves, projections or slopes of roofs or other constructions. This malleability of the reinforcements thus enables any shaping of the material to be effected in accordance with the requirements of use, without risk of breaking.

In course of use, the homogeneity and the elasticity of the material in accordance with the invention, enable the latter to withstand without ill-effects stresses due to the movement of the construction to be covered or protected, such as those resulting from settlement, cracking, etc., and this within appreciably wider limits than those which can be regarded as admissible with known materials of similar kinds.

The composition of the material in accordance with the invention enables furthermore, the drawback of extra thicknesses due to overlapping of the sheets at the joints, to be overcome. By reason of the inherent waterproof properties of the reinforcement or reinforcements of plastic material, the tightness at the joints is increased by the superposition of two adjacent sheets, which results in the superposition of twice as many reinforcements waterproof in themselves.

Thus, at these points, the quantity and the thickness of the proofing base can be reduced without ill-effects, and this enables the extra thicknesses usually provided at the joints to be eliminated.

The material in accordance with the invention, may be built-up by means of sheets of plastic material prepared in advance with or without preparation of the surface, which are placed over a layer of proofing base and which are then covered by a thickness of proofing base. Over the latter, there may be applied a further sheet of plastic material which is covered in turn with a further layer of proofing base, and so on. There is thus finally obtained a flexible waterproof sheet which can be delivered in sheets, or better still in rolls, easy to place in position.

It is to be noted that the water-tightness of the reinforcements in accordance with the invention, facilitates, when required, the use of proofing bases of compositions which vary from one layer to the next.

It is also possible to prepare sheets of plastic material in such manner that they complete with advantage their period of setting in contact with the proofing base and bonded hereto.

The manufacture of the material may even be carried out starting with the constituent elements of the plastic material itself by combining its production in the form of sheets with the application of the proofing base; certain parts of this proofing base may even form constituent parts of the plastic reinforcements, for example as plastifying agents. In this way, these elements may be spread over the proofing base. The polymerisation and the setting of the plastic sheet or sheets then takes place in contact with the proofing bases, the working temperatures of the latter being often the same as those required for the polymerisation and the condensation of the plastic material or being capable of choice in accordance with these temperatures.

Furthermore, parts only of the waterproof sheets thus prefabricated may be made in advance, for reasons connected with the site or so as to combine them with other materials or with other waterproof elements. For example, in connecion with questions of surfacing, protection or joints, or again if it is desired to combine together two or a number of elements on the site.

Finally, it is possible to vary the relative thicknesses of the reinforcements and the proofing base in the case of new applications. For example, for the replacement of metallic sheeting: lead, zinc, copper, aluminum, for purposes such as hopper-heads for water down-pipes, bellows of expansion joints, fitting of gutters, mouldings, strips, etc. The presence of the proofing base, whilst ensuring a better contact with the parts to be covered, protects the plastic materials against the effects of excessive heat during application.

*Example 1*

In order to produce a waterproof coating such as that shown in Fig. 1 of the attached drawings, the procedure is as follows:

A layer 1 of bitumen of 1.5 mm. in thickness is poured, and on this layer of bitumen, there is placed while hot a sheet 2 of polyvinyl chloride having a thickness of 2/10 mm. A second layer 3 of bitumen is then poured to a thickness of 1.5 mm., and a further sheet 4 of polyvinyl chloride, also of 2/10 mm. in thickness, is added. The same operation is repeated once more, with a layer 5 of bitumen and a sheet 6 of polyvinyl chloride. The operations are completed by a layer 7 of bitumen.

There is thus obtained a flexible sheet with three reinforcements and a thickness of 6.6 mm. which is suitable for delivery as a roll.

In the same way, there may be provided one, two, or four reinforcements, or any desired number of these reinforcing sheets.

This composite sheet can be directly used for the manufacture of a roof. It is unrolled on the surface to be covered in adjacent strips which overlap each other and are jointed to each other in situ.

*Example 2*

Figure 2:
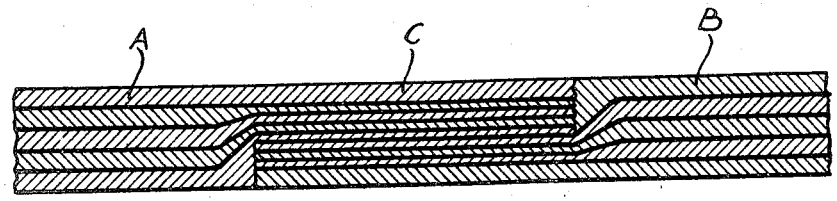

In the composite sheet built-up as described in Example 1, and having, for example, four reinforcements, the edge is produced during the production process with a reduced thickness as shown in Fig. 2. To this end, the thickness of bitumen inserted between the reinforcements are thinner.

During the fixing in position, two adjacent strips A and B are placed together at C in such a way that the thinner edges are superposed, and the jointing is carried out in the usual manner.

By reason of the thinner portions at the edges, the total thickness of the joint at C, in spite of the superposition of the thicknesses of the sheets A and B, is substantially equal to the normal thickness of the composite sheet.

The joint is made without resulting in additional thickness, but with a number of reinforcements which increase the watertightness at C.

What we claim is:

1. A waterproof covering material for buildings, comprising a succession of superposed alternate layers of bituminous material and thin continuous flexible sheets of synthetic resin selected from the group consisting of polystyrene, polyethylene, and polyvinyl chloride, said sheets having a thickness of substantially 0.2 mm., said sheets being incorporated between the layers of the bituminous material and by virtue of being impermeable to gases makes the entire covering material waterproof, rotproof, and impervious to chemical action.

2. A waterproof covering material for buildings as set forth in claim 1, wherein the interposed flexible sheets of synthetic resin are crimped.

3. A waterproof covering material for buildings as set forth in claim 1, wherein the bituminous layers have their thickness reduced to half in the zone of vicinity of the edges of said covering material, while the thin sheets of synthetic resin are present in the said zone in the same number as in the central portion of the covering material but closer to each other.

References Cited in the file of this patent

UNITED STATES PATENTS

| | | |
|---|---|---|
| 1,207,853 | Burrell | Dec. 12, 1916 |
| 2,311,573 | Shoan | Feb. 16, 1943 |
| 2,441,477 | Farrell | May 11, 1948 |
| 2,548,029 | Kurtz et al. | Apr. 10, 1951 |

FOREIGN PATENTS

| | | |
|---|---|---|
| 1,042,107 | France | Oct. 29, 1953 |

OTHER REFERENCES

"Laminants and Coatings," by F. B. Speyer in Paper Trade Journal, vol. 121, No. 1; July 5, 1945; pp. 33–36.